US010175399B2

(12) United States Patent
Anzai et al.

(10) Patent No.: US 10,175,399 B2
(45) Date of Patent: Jan. 8, 2019

(54) MIRROR WITH IMAGE DISPLAY FUNCTION

(71) Applicant: FUJIFILM Corporation, Tokyo (JP)

(72) Inventors: Akihiro Anzai, Minami-ashigara (JP); Kazuhiro Oki, Minami-ashigara (JP); Mitsuyoshi Ichihashi, Minami-ashigara (JP); Takao Taguchi, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/609,358

(22) Filed: May 31, 2017

(65) Prior Publication Data

US 2017/0261666 A1   Sep. 14, 2017

Related U.S. Application Data

(63) Continuation of application No. PCT/JP2015/083565, filed on Nov. 30, 2015.

(30) Foreign Application Priority Data

Dec. 1, 2014 (JP) ................................. 2014-243444

(51) Int. Cl.
| | |
|---|---|
| *G02B 5/30* | (2006.01) |
| *A47G 1/04* | (2006.01) |
| *G02F 1/1335* | (2006.01) |
| *B60R 1/08* | (2006.01) |
| *A47G 1/00* | (2006.01) |
| *G02B 5/26* | (2006.01) |
| *G09F 9/00* | (2006.01) |
| *G09F 19/16* | (2006.01) |
| *A47G 1/06* | (2006.01) |
| *G02F 1/1333* | (2006.01) |
| *G02F 1/13363* | (2006.01) |

(52) U.S. Cl.
CPC ............ *G02B 5/3016* (2013.01); *A47G 1/00* (2013.01); *A47G 1/04* (2013.01); *A47G 1/06* (2013.01); *G02B 5/26* (2013.01); *G02B 5/30* (2013.01); *G02F 1/13363* (2013.01); *G02F 1/133308* (2013.01); *G02F 1/133536* (2013.01); *G09F 9/00* (2013.01); *G09F 19/16* (2013.01); *B60R 1/088* (2013.01); *G02F 2001/133541* (2013.01); *G02F 2001/133543* (2013.01); *G02F 2001/133633* (2013.01); *G02F 2001/133638* (2013.01); *G02F 2413/01* (2013.01); *G02F 2413/05* (2013.01)

(58) Field of Classification Search
CPC ............ G02F 1/13363; G02F 2202/40; G02F 2001/133638; G02F 2001/133541; G02B 5/3083; G02B 5/3016; B60R 1/088; A47G 1/04

See application file for complete search history.

(56) References Cited

U.S. PATENT DOCUMENTS

| | | | | |
|---|---|---|---|---|
| 6,111,700 A | * | 8/2000 | Kobayashi | G02B 5/3025 348/E9.027 |
| 8,599,339 B2 | * | 12/2013 | Lee | G02F 1/133632 349/117 |
| 2002/0036735 A1 | * | 3/2002 | Arakawa | G02B 5/3016 349/115 |
| 2003/0038918 A1 | | 2/2003 | Kashima et al. | |
| 2003/0063245 A1 | | 4/2003 | Bowley et al. | |
| 2005/0035353 A1 | * | 2/2005 | Adachi | H01L 27/12 257/72 |
| 2005/0266158 A1 | * | 12/2005 | Pokorny | G02B 5/3016 427/162 |
| 2006/0132681 A1 | | 6/2006 | Park et al. | |
| 2006/0204681 A1 | * | 9/2006 | Kim | C09K 19/2007 428/1.31 |
| 2007/0046794 A1 | * | 3/2007 | He | H04N 9/045 348/272 |
| 2008/0043187 A1 | * | 2/2008 | Mimura | G02F 1/133528 349/114 |
| 2008/0252833 A1 | * | 10/2008 | Nieuwkerk | B60R 1/088 349/115 |
| 2009/0058779 A1 | * | 3/2009 | Yoshihara | G02F 1/13476 345/89 |
| 2014/0022493 A1 | * | 1/2014 | Hoshino | G09F 3/0294 349/86 |
| 2015/0062505 A1 | * | 3/2015 | Hatanaka | C09J 7/0296 349/98 |
| 2016/0026039 A1 | | 1/2016 | Sakai et al. | |

FOREIGN PATENT DOCUMENTS

| | | |
|---|---|---|
| JP | 2002-229494 A | 8/2002 |
| JP | 2003-227933 A | 8/2003 |
| JP | 2004-62212 A | 2/2004 |
| JP | 3500127 B2 | 2/2004 |
| JP | 2004-184491 A | 7/2004 |
| JP | 2004184491 A * | 7/2004 |
| JP | 2004-309618 A | 11/2004 |
| JP | 2009-175766 A | 8/2009 |
| JP | 2011-45427 A | 3/2011 |
| JP | 2014-201146 A | 10/2014 |
| WO | WO 2014/112525 A1 | 7/2014 |

OTHER PUBLICATIONS

International Search Report, issued in PCT/JP2015/083565, dated Feb. 16, 2016.

(Continued)

*Primary Examiner* — Jia Pan
(74) *Attorney, Agent, or Firm* — Birch, Stewart, Kolasch & Birch, LLP

(57) ABSTRACT

According to the invention, there is provided a mirror with an image display function including, in this order: an image display device; a ¼ wavelength plate; a circular polarization reflection layer; and a front surface plate made of glass or plastic, in which the circular polarization reflection layer includes a cholesteric liquid crystal layer, and the cholesteric liquid crystal layer has a central wavelength of selective reflection in a visible light region. The mirror with an image display function of the invention is capable of displaying a bright image.

7 Claims, No Drawings

(56) References Cited

OTHER PUBLICATIONS

Written Opinion of the International Searching Authority, issued in PCT/JP2015/083565, dated Feb. 16, 2016.
Notification Concerning Transmittal of International Preliminary Report on Patentability; International Preliminary Report on Patentability; Notification of Transmittal of Translation of the International Preliminary Report on Patentability and English Translation of Written Opinion of the International Searching Authority dated Jun. 15, 2017, issued in PCT/JP2015/083565 (Forms PCT/IB/326, PCT/IB/373, PCT/IB/338 and PCT/ISA/237.
Extended European Search Report dated Nov. 21, 2017 for corresponding European Application No. 15866151.2.
Japanese Office Action, dated Feb. 6, 2018, for corresponding Japanese Application No. 2016-562443, with an English machine translation.
Japanese Office Action, dated Oct. 2, 2018, for corresponding Japanese Application No. 2016-562443, along with an English machine translation.
Chinese Office Action issued in corresponding Application No. 201580064447.8, dated Nov. 1, 2018 with English language translation.

* cited by examiner

MIRROR WITH IMAGE DISPLAY FUNCTION

CROSS-REFERENCE TO RELATED APPLICATIONS

This application is a continuation of PCT International Application No. PCT/JP2015/083565 filed on Nov. 30, 2015, which claims priority under 35 U.S.C § 119 (a) to Japanese Patent Application No. 2014-243444 filed on Dec. 1, 2014, the entire content of which is incorporated herein by reference.

BACKGROUND OF THE INVENTION

1. Field of the Invention

The present invention relates to a mirror with an image display function.

2. Description of the Related Art

For example, image display devices with a mirror function, in which a half mirror is provided on a surface of an image display portion of the image display device to allow the mirror to display an image in a display mode and to allow the mirror to function as a mirror in a non-display mode such as a power-off mode of the image display device, are described in JP2002-229494A, JP2011-45427A, and JP2014-201146A.

SUMMARY OF THE INVENTION

In general, the visible light transmittance of a half mirror is approximately 30% to 70%, and a configuration in which a half mirror is provided on a surface of an image display portion has a potential problem in that an image appears darker than that in a configuration with no half mirror. An object of the invention is to solve the problem. That is, an object of the invention is to provide a mirror with an image display function capable of displaying a brighter image.

The inventors have conducted intensive studies to achieve the object, and thought of an optical design of a half mirror in consideration of characteristics of light for image display. Based on this thought, the inventors have performed optical design and produced a half mirror using a material suitable for the optical design, and thus completed the invention.

That is, the invention provides the following [1] to [10].

[1] A mirror with an image display function comprising, in this order: an image display device; a ¼ wavelength plate; a circular polarization reflection layer; and a front surface plate made of glass or plastic, in which the circular polarization reflection layer includes a cholesteric liquid crystal layer, and the cholesteric liquid crystal layer has a central wavelength of selective reflection in a visible light region.

[2] The mirror with an image display function according to [1], in which the circular polarization reflection layer includes two or more cholesteric liquid crystal layers, and the two or more cholesteric liquid crystal layers have different central wavelengths of selective reflection.

[3] The mirror with an image display function according to [2], in which the two or more cholesteric liquid crystal layers are in direct contact with each other.

[4] The mirror with an image display function according to any one of [1] to [3], in which the circular polarization reflection layer includes three or more cholesteric liquid crystal layers, and the three or more cholesteric liquid crystal layers have different central wavelengths of selective reflection.

[5] The mirror with an image display function according to [4], in which the circular polarization reflection layer includes a cholesteric liquid crystal layer having a central wavelength of selective reflection in a red light wavelength region, a cholesteric liquid crystal layer having a central wavelength of selective reflection in a green light wavelength region, and a cholesteric liquid crystal layer having a central wavelength of selective reflection in a blue light wavelength region.

[6] The mirror with an image display function according to [4] or [5], in which in the circular polarization reflection layer, a cholesteric liquid crystal layer having a longer central wavelength of selective reflection is disposed closer to the image display device.

[7] The mirror with an image display function according to any one of [1] to [6], in which the circular polarization reflection layer includes a cholesteric liquid crystal layer having a central wavelength of selective reflection in an infrared light region.

[8] The mirror with an image display function according to any one of [1] to [7], in which the ¼ wavelength plate is a layer formed by curing a composition containing a polymerizable liquid crystal compound.

[9] The mirror with an image display function according to any one of [1] to [8], in which the circular polarization reflection layer and the ¼ wavelength plate are in direct contact with each other.

[10] The mirror with an image display function according to any one of [1] to [9], in which the image display device and the ¼ wavelength plate are directly adhered to each other through an adhesive layer.

According to the invention, there is provided a novel mirror with an image display function. The mirror with an image display function of the invention is capable of displaying a brighter image. In addition, the mirror with an image display function of the invention is good in terms of the front tint even when being used as a mirror. In addition, the mirror with an image display function of the invention has an advantage in that images and mirror-reflected images can be observed even through polarized sunglasses without direction dependency.

DESCRIPTION OF THE PREFERRED EMBODIMENTS

Hereinafter, the invention will be described in detail.

In this specification, "to" is used to mean that numerical values before and after "to" are included as a lower limit value and an upper limit value.

In this specification, an angle such as "45°", "parallel", "vertical", or "perpendicular" means that a difference from an exact angle is in a range less than 5 degrees unless otherwise stated. The difference from an exact angle is preferably less than 4 degrees, and more preferably less than 3 degrees.

In this specification, "(meth)acrylate" is used to mean "one or both of acrylate and methacrylate".

In this specification, when "selectively" is used in regard to circularly polarized light, it means that the light quantity of any one of a right circular polarization component and a left circular polarization component of emitted light is greater than that of the other circular polarization component. Specifically, when "selectively" is used, the circular polarization degree of light is preferably 0.3 or greater, more preferably 0.6 or greater, and even more preferably 0.8 or greater. Substantially, the circular polarization degree is yet even more preferably 1.0.

Here, the circular polarization degree is a value which is expressed by $|I_R-I_L|/(I_R+I_L)$ where the intensity of a right circular polarization component of light is represented by $I_R$, and the intensity of a left circular polarization component is represented by $I_L$.

In this specification, when "sense" is used in regard to circularly polarized light, it means that the light is either right-circularly polarized light or left-circularly polarized light. The sense of circularly polarized light is defined such that, in a case where light is viewed as it proceeds toward an observer and in a case where the tip of an electric field vector rotates clockwise with the increase in time, the light is right-circularly polarized light, and in a case where it rotates counterclockwise, the light is left-circularly polarized light.

In this specification, the term "sense" may be used in regard to a twisted direction of the helix of cholesteric liquid crystal. Regarding selective reflection by cholesteric liquid crystal, in a case where a twisted direction (sense) of the helix of the cholesteric liquid crystal is right-handed, the right-circularly polarized light is reflected and the left-circularly polarized light is transmitted. In a case where the sense is left-handed, the left-circularly polarized light is reflected, and the right-circularly polarized light is transmitted.

In electromagnetic rays, visible light rays are light rays in a wavelength region human's eyes can see, and refer to light in a wavelength region of 380 nm to 780 nm. Infrared rays (infrared light) are electromagnetic rays in a wavelength region which is longer than visible light rays and shorter than radio waves. In infrared rays, near-infrared light refers to electromagnetic rays in a wavelength region of 780 nm to 2500 nm.

In this specification, when "image" is used in regard to a mirror with an image display function, it means an image which can be observed by visually recognizing a half mirror from a front surface plate side when an image display portion of an image display device displays the image. In addition, in this specification, when "mirror-reflected image" is used in regard to the mirror with an image display function, it means an image which can be observed by being visually recognized from a front surface plate when the image display portion of the image display device displays no image.

In this specification, the front phase difference is a value measured using AxoScan manufactured by Axometrix. The measured wavelength is 550 nm unless otherwise stated. As the front phase difference, a value measured by making light with a wavelength in a visible light wavelength region, such as a central wavelength of selective reflection of a cholesteric liquid crystal layer, incident in a film normal direction in KOBRA 21ADH or WR (manufactured by Oji Scientific Instruments) can also be used. In the selection of the measured wavelength, a wavelength selective filter can be manually replaced, or the measured value can be converted by a program or the like for measurement.

<Mirror with Image Display Function>

A mirror with an image display function of the invention includes an image display device, a ¼ wavelength plate, a circular polarization reflection layer, and a front surface plate in this order. Between the image display device and the ¼ wavelength plate, or between the circular polarization reflection layer and the front surface plate, other layers such as an adhesive layer may be included or not included. It is preferable that the circular polarization reflection layer and the front surface plate are directly adhered to each other. Other layers such as an adhesive layer may be included between the ¼ wavelength plate and the circular polarization reflection layer, but it is preferable that the ¼ wavelength plate and the circular polarization reflection layer are directly adhered to each other. In addition, it is preferable that the ¼ wavelength plate and the circular polarization reflection layer are laminated in the same area. The image display device and the ¼ wavelength plate may be in direct contact with each other, an air layer may exist therebetween, or the image display device and the ¼ wavelength plate may be directly adhered to each other through an adhesive layer.

In this specification, a surface on the front surface plate side of the circular polarization reflection layer may be a front surface.

The image display device may be adhered to the ¼ wavelength plate in at least a part of the image display portion. The area of the surface of the ¼ wavelength plate to be adhered may be smaller than, the same as, or larger than that of the image display portion.

The front surface plate may be larger than, the same as, or smaller than the circular polarization reflection layer. The circular polarization reflection layer may be adhered to a part of the front surface plate, and another type of reflection layer such as metal foil may be adhered to or formed on the other portion of the front surface plate. In this configuration, it is possible to display an image on a part of the mirror. The circular polarization reflection layer may be adhered to the entire surface of the front surface plate, and the image display device having an image display portion with the same area as the circular polarization reflection layer may be adhered to the ¼ wavelength plate in the image display portion. In this configuration, it is possible to display an image on the entire surface of the mirror.

In the adhesion of the ¼ wavelength plate to the image display device, the angle of the ¼ wavelength plate is preferably adjusted such that the image is made brightest. That is, particularly, in order to allow linearly polarized light to be most satisfactorily transmitted through the image display device which displays an image with linearly polarized light, the relationship between a polarization direction (transmission axis) of the linearly polarized light and a slow axis of the ¼ wavelength plate is preferably adjusted. For example, in a case of a single layer-type ¼ wavelength plate, the transmission axis and the slow axis preferably form an angle of 45°. The light emitted from the image display device which displays an image with linearly polarized light is transmitted through the ¼ wavelength plate, and then becomes circularly polarized light of any one of right sense and left sense. The circular polarization reflection layer to be described later is preferably composed of a cholesteric liquid crystal layer having a twisted direction in which the circularly polarized light of the above-described sense is transmitted.

In the mirror with an image display function of the invention, due to the ¼ wavelength plate included between the image display device and the circular polarization reflection layer, the light from the image display device can be converted into circularly polarized light and allowed to incident on the circular polarization reflection layer. Therefore, the light reflected by the circular polarization reflection layer and returning to the image display device side can be significantly reduced, and a bright image can be displayed.

[Image Display Device]

The image display device is not particularly limited, but is preferably a liquid crystal display device. The image display device is preferably an image display device which emits (emits) linearly polarized light to form an image.

The liquid crystal display device may be a transmission type or a reflection type, and is particularly preferably a transmission type. The liquid crystal display device may be a liquid crystal display device of any one of an in plane switching (IPS) mode, a fringe field switching (FFS) mode, a vertical alignment (VA) mode, an electrically controlled birefringence (ECB) mode, a super twisted nematic (STN) mode, a twisted nematic (TN) mode, an optically compensated bend (OCB) mode, and the like.

The image which is displayed on the image display portion of the image display device may be a still image, a motion picture, or simple texture information. The display may be monochrome display such as black and white display, multi-color display, or full-color display.

[¼ Wavelength Plate]

The ¼ wavelength plate may be a retardation layer which functions as a ¼ wavelength plate in a visible light region. Examples of the ¼ wavelength plate include a single layer-type ¼ wavelength plate and a broadband ¼ wavelength plate in which a ¼ wavelength plate and a ½ wavelength retardation plate are laminated.

The front phase difference of the former ¼ wavelength plate may be ¼ of the light emission wavelength of the image display device. Therefore, as the ¼ wavelength plate, a retardation layer which exhibits inverse dispersibility such that for example, in a case where the light emission wavelength of the image display device is 450 nm, 530 nm, or 640 nm, the front phase difference is 112.5 nm±10 nm, preferably 112.5 nm±5 nm, and more preferably 112.5 nm with a wavelength of 450 nm, the front phase difference is 132.5 nm±10 nm, preferably 132.5 nm±5 nm, and more preferably 132.5 nm with a wavelength of 530 nm, and the front phase difference is 160 nm±10 nm, preferably 160 nm±5 nm, and more preferably 160 nm with a wavelength of 640 nm is most preferable. However, a retardation plate which exhibits small wavelength dispersibility of phase difference or a retardation plate which exhibits forward dispersibility can also be used. The inverse dispersibility means a property that as the longer the wavelength, the larger the absolute value of the phase difference. The forward dispersibility means a property that as the shorter the wavelength, the larger the absolute value of the phase difference.

In the lamination-type ¼ wavelength plate, the ¼ wavelength plate and the ½ wavelength retardation plate are bonded such that an angle of a slow axis thereof is 60°, and thus the ½ wavelength retardation plate side is disposed on the side on which linearly polarized light is incident, and the slow axis of the ½ wavelength retardation plate intersects with the polarization surface of the incident linearly polarized light by 15° or 75°. Since the lamination-type ¼ wavelength plate exhibits good inverse dispersibility of phase difference, it can be suitably used.

In this specification, the phase difference means front retardation. The phase difference can be measured using a polarization phase difference analyzer AxoScan manufactured by AXOMETRICS. The phase difference may be measured by making light with a specific wavelength incident in a film normal direction in KOBRA 21ADH or WR (manufactured by Oji Scientific Instruments).

The ¼ wavelength plate is not particularly limited, and can be appropriately selected in accordance with the purpose. Examples thereof include a quartz plate, a stretched polycarbonate film, a stretched norbornene-based polymer film, a transparent film containing aligned inorganic grains having birefringence such as strontium carbonate, and a thin film in which an inorganic dielectric material is obliquely vapor-deposited on a support.

Examples of the ¼ wavelength plate include (1) a retardation plate described in JP1993-27118A (JP-H5-27118A) and JP1993-27119A (JP-H5-27119A) in which a birefringent film having large retardation and a birefringent film having small retardation are laminated such that optical axes thereof are perpendicular to each other, (2) a retardation plate described in JP1998-68816A (JP-H10-68816A) in which a polymer film having a λ/4 wavelength at a specific wavelength and a polymer film made of the same material as the former polymer film and having a λ/2 wavelength at the same wavelength are laminated to obtain a λ/4 wavelength in a wide wavelength region, (3) a retardation plate described in JP1998-90521 (JP-H10-90521), capable of achieving a λ/4 wavelength in a wide wavelength region by laminating two polymer films, (4) a retardation film capable of achieving a λ/4 wavelength in a wide wavelength region by using a modified polycarbonate film described in WO00/26705A, and (5) a retardation plate capable of achieving a λ/4 wavelength in a wide wavelength region by using cellulose acetate film described in WO00/65384A.

A commercially available product can also be used as the ¼ wavelength plate. Examples of the commercially available product include PURE-ACE WR (product name) (manufactured by TEIJIN LIMITED).

The ¼ wavelength plate may be formed by arranging and fixing a polymerizable liquid crystal compound or a polymer liquid crystal compound. For example, the ¼ wavelength plate can be formed by coating a temporary support, an alignment film, or a surface of the front surface plate with a liquid crystal composition, forming the polymerizable liquid crystal compound in the liquid crystal composition in a nematic alignment in a liquid crystal state, and then fixing the alignment by photo-crosslinking or thermal crosslinking. Details of the liquid crystal composition or the producing method thereof will be described later. The ¼ wavelength plate may be a layer which is obtained by coating a temporary support, an alignment film, or a surface of the front surface plate with a liquid crystal composition containing a polymer liquid crystal compound, forming the compound in a nematic alignment in a liquid crystal state, and then fixing the alignment by cooling.

[Circular Polarization Reflection Layer]

In the mirror with an image display function of the invention, since the circular polarization reflection layer is used, incidence rays from the front surface can be reflected as circularly polarized light, and incidence rays from the image display device can be transmitted as circularly polarized light. Accordingly, in the mirror with an image display function of the invention, it is possible to observe images and mirror-reflected images even through polarized sunglasses without depending on the relationship between the transmission axis direction of the polarized sunglasses and the horizontal direction of the mirror with an image display function.

The circular polarization reflection layer includes at least one cholesteric liquid crystal layer exhibiting selective reflection in a visible light region. The circular polarization reflection layer may include two or more cholesteric liquid crystal layers, and may include other layers such as an alignment layer. The circular polarization reflection layer preferably consists only of a cholesteric liquid crystal layer. When the circular polarization reflection layer includes a plurality of cholesteric liquid crystal layers, these are preferably in direct contact with an adjacent cholesteric liquid crystal layer. The circular polarization reflection layer preferably includes three or more cholesteric liquid crystal layers.

The film thickness of the circular polarization reflection layer is preferably in a range of 2.0 μm to 300 μm, and more preferably in a range of 8.0 μm to 200 μm.

(Cholesteric Liquid Crystal Layer)

In this specification, the cholesteric liquid crystal layer means a layer in which a cholesteric liquid crystalline phase is fixed. The cholesteric liquid crystal layer may be simply referred to as a liquid crystal layer.

The cholesteric liquid crystalline phase has been known to exhibit circular polarization selective reflection in which circularly polarized light of any one sense of either right-circularly polarized light or left-circularly polarized light is selectively reflected and circularly polarized light of the other sense is transmitted in a specific wavelength region. In this specification, the circular polarization selective reflection may be simply referred to as selective reflection.

As a film including a layer in which a cholesteric liquid crystalline phase exhibiting circular polarization selective reflectivity is fixed, many films formed from a composition containing a polymerizable liquid crystal compound have been known, and regarding the cholesteric liquid crystal layer, the related arts can be referred to.

The cholesteric liquid crystal layer may be a layer in which alignment of a liquid crystal compound in a cholesteric liquid crystalline phase is held. Typically, the cholesteric liquid crystal layer may be a layer obtained in such a manner that a polymerizable liquid crystal compound is allowed to be in an alignment state of a cholesteric liquid crystalline phase, and polymerized and cured by ultraviolet irradiation, heating, or the like to form a layer having no fluidity, and at the same time, the layer is changed such that the form of alignment is not changed by an external field or an external force. In the cholesteric liquid crystal layer, the optical properties of the cholesteric liquid crystalline phase just need to be held in the layer, and the liquid crystal compound in the layer may not exhibit liquid crystallinity. For example, the molecular weight of the polymerizable liquid crystal compound may be increased by a curing reaction, and the liquid crystallinity may be lost.

A central wavelength λ of selective reflection of the cholesteric liquid crystal layer depends on a pitch P (periodicity of helix) of a helical structure in a cholesteric phase, and has a relationship of λ=n×P with an average refractive index n of the cholesteric liquid crystal layer. In this specification, the central wavelength λ of selective reflection of the cholesteric liquid crystal layer means a wavelength at a centroid position of a reflection peak of a circular polarization reflection spectrum measured in a normal direction of the cholesteric liquid crystal layer. In this specification, the central wavelength of selective reflection means a central wavelength when measured in the normal direction of the cholesteric liquid crystal layer.

As is obvious from the above formula, the central wavelength of selective reflection can be adjusted by adjusting the pitch of the helical structure. By adjusting the n value and the P value, any one of right-circularly polarized light and left-circularly polarized light is selectively reflected with respect to light with a desired wavelength, and thus the central wavelength λ can be adjusted.

In a case where light is obliquely incident on the cholesteric liquid crystal layer, the central wavelength of selective reflection shifts to the short wavelength side. Therefore, with respect to the wavelength of selective reflection necessary for image display, n×P is preferably adjusted such that λ calculated in accordance with the above formula λ=n×P becomes a long wavelength. When the central wavelength of selective reflection when light rays pass through a cholesteric liquid crystal layer with a refractive index $n_2$ in a normal direction of the cholesteric liquid crystal layer (a helical axis direction of the cholesteric liquid crystal layer) at an angle of $\theta_2$ is represented by $\lambda_d$, $\lambda_d$ is expressed by the following formula.

$$\lambda_d = n_2 \times P \times \cos \theta_2$$

In the mirror with an image display function of the invention, resulting from the above-described selective reflection property, tint change may occur in images and mirror-reflected images viewed in an oblique direction. The tint change in a mirror-reflected image can be prevented in a case where the circular polarization reflection layer includes a cholesteric liquid crystal layer having a central wavelength of selective reflection in an infrared light region. In this case, the central wavelength of selective reflection of the infrared light region may be specifically 780 to 900 nm, and preferably 780 to 850 nm.

Since the pitch of the cholesteric liquid crystalline phase depends on the type or the concentration of a chiral agent which is used together with the polymerizable liquid crystal compound, a desired pitch can be obtained by adjusting the type or the concentration. Furthermore, methods described in "Introduction to Liquid Crystal Chemical Test", p. 46, edited by Japan Liquid Crystal Society, published by Sigma Publications, 2007, and "Liquid Crystal Handbook", p. 196, Liquid Crystal Handbook Editing Committee Maruzen can be used as a method of measuring the sense or the pitch of the helix.

In the mirror with an image display function of the invention, the circular polarization reflection layer preferably includes a cholesteric liquid crystal layer having a central wavelength of selective reflection in a red light wavelength region, a cholesteric liquid crystal layer having a central wavelength of selective reflection in a green light wavelength region, and a cholesteric liquid crystal layer having a central wavelength of selective reflection in a blue light wavelength region. The reflection layer preferably includes, for example, a cholesteric liquid crystal layer having a central wavelength of selective reflection in 400 nm to 500 nm, a cholesteric liquid crystal layer having a central wavelength of selective reflection in 500 nm to 580 nm, and a cholesteric liquid crystal layer having a central wavelength of selective reflection in 580 nm to 700 nm.

When the circular polarization reflection layer includes a plurality of cholesteric liquid crystal layers, a cholesteric liquid crystal layer closer to the image display device preferably has a longer central wavelength of selective reflection. Due to this configuration, tint change occurring when the image display layer and mirror-reflected images are obliquely observed can be suppressed.

In a case where the central wavelength of selective reflection of the cholesteric liquid crystal layer to be used is adjusted in accordance with the light emitting wavelength region of the image display device and the use mode of the circular polarization reflection layer, a bright image can be displayed with high light utilization efficiency. Examples of the use mode of the circular polarization reflection layer include an incidence angle of light on the circular polarization reflection layer and an image observation direction.

The sense of the reflected circularly polarized light of the cholesteric liquid crystal layer is identical to the sense of the helix. As each cholesteric liquid crystal layer, a cholesteric liquid crystal layer in which the sense of the helix is right-handed or left-handed in accordance with the sense of circularly polarized light of a sense obtained by emission from the image display device and transmission through the ¼ wavelength plate is used. Specifically, a cholesteric liquid crystal layer having a sense of a helix which transmits circularly polarized light of a sense obtained by emission from the image display device and transmission through the ¼ wavelength plate may be used. When the circular polarization reflection layer includes a plurality of cholesteric liquid crystal layers, senses of helices thereof are preferably the same.

A half-width $\Delta\lambda$ (nm) of a selective reflection band in which selective reflection is exhibited depends on the birefringence $\Delta n$ of the liquid crystal compound and the pitch P, and has a relationship of $\Delta\lambda=\Delta n \times P$ therewith. Therefore, the width of the selective reflection band can be controlled by adjusting $\Delta n$. $\Delta n$ can be adjusted by adjusting the type or the mixing ratio of the polymerizable liquid crystal compound or controlling the temperature at the time of alignment fixing.

In order to form one type of cholesteric liquid crystal layers having the same central wavelength of selective reflection, a plurality of cholesteric liquid crystal layers having the same periodicity P and the same sense of the helix may be laminated. By laminating cholesteric liquid crystal layers having the same periodicity P and the same sense of the helix, circular polarization selectivity can be increased at a specific wavelength.

[Method of Producing ¼ Wavelength Plate and Cholesteric Liquid Crystal Layer]

Hereinafter, materials and methods for producing the ¼ wavelength plate and the cholesteric liquid crystal layer which are formed from a liquid crystal composition will be described.

Examples of the material used to form the ¼ wavelength plate include a liquid crystal composition containing a polymerizable liquid crystal compound. The material used to form the cholesteric liquid crystal layer preferably further contains a chiral agent (optical active compound). The liquid crystal composition which is further mixed with a surfactant, a polymerization initiator, or the like if necessary and dissolved in a solvent or the like is coated on a support, a temporary support, an alignment film, a ¼ wavelength plate, a cholesteric liquid crystal layer serving as an underlayer, or the like, and after alignment and maturing, the liquid crystal composition is cured for fixing to form the ¼ wavelength plate or the cholesteric liquid crystal layer.

(Polymerizable Liquid Crystal Compound)

A rod-like liquid crystal compound may be used as the polymerizable liquid crystal compound.

Examples of the rod-like polymerizable liquid crystal compound include a rod-like nematic liquid crystal compound. As the rod-like nematic liquid crystal compound, azomethines, azoxys, cyanobiphenyls, cyanophenyl esters, benzoic acid esters, cyclohexanecarboxylic acid phenyl esters, cyanophenylcyclohexanes, cyano-substituted phenylpyrimidines, alkoxy-substituted phenylpyrimidines, phenyl dioxanes, tolans, and alkenylcyclohexyl benzonitriles are preferably used. It is possible to use not only a low-molecular liquid crystal compound, but also a high-molecular liquid crystal compound.

The polymerizable liquid crystal compound is obtained by introducing a polymerizable group in a liquid crystal compound. Examples of the polymerizable group include an unsaturated polymerizable group, an epoxy group, and an aziridinyl group. An unsaturated polymerizable group is preferable, and an ethylene unsaturated polymerizable group is particularly preferable. The polymerizable group can be introduced in molecules of a liquid crystal compound by various methods. The number of the polymerizable groups in the polymerizable liquid crystal compound is preferably 1 to 6, and more preferably 1 to 3. Examples of the polymerizable liquid crystal compound include those described in Makromol. Chem., vol. 190, p. 2255 (1989), Advanced Materials, vol. 5, p. 107 (1993), U.S. Pat. No. 4,683,327A, U.S. Pat. No. 5,622,648A, U.S. Pat. No. 5,770,107A, WO95/22586A, WO95/24455A, WO97/00600A, WO98/23580A, WO98/52905A, JP1989-272551A (JP-H1-272551A), JP1994-16616A (JP-H6-16616A), JP1995-110469A (JP-H7-110469A), JP1999-80081A (JP-H11-80081A), and JP2001-328973A. Two or more types of polymerizable liquid crystal compounds may be used in combination. Using two or more types of polymerizable liquid crystal compounds may contribute to lowering the alignment temperature.

The amount of the polymerizable liquid crystal compound added in the liquid crystal composition is preferably 80 to 99.9 mass %, more preferably 85 to 99.5 mass %, and particularly preferably 90 to 99 mass % with respect to the solid content mass of the liquid crystal composition (mass excluding the mass of the solvent).

(Chiral Agent: Optical Active Compound)

The material used to form the cholesteric liquid crystal layer preferably contains a chiral agent. The chiral agent functions to induce the helical structure of the cholesteric liquid crystalline phase. The chiral compound may be selected in accordance with the purpose since compounds are different in the helix pitch or the sense of the helix to be induced.

The chiral agent is not particularly limited, and a known compound (for example, chiral agents for TN or STN, which are described in Liquid Crystal Device Handbook, Third Chapter, 4-3 Chapter, p. 199, edited by No. 142 Committee of Japan Society for the Promotion of Science, in 1989), isosorbide, or an isomannide derivative can be used.

In general, the chiral agent contains asymmetric carbon atoms. However, an axial asymmetric compound or a planar asymmetric compound containing no asymmetric carbon atoms can also be used as a chiral agent. Examples of the axial asymmetric compound or the planar asymmetric compound include binaphthyl, helicene, paracyclophane, and their derivatives. The chiral agent may have a polymerizable group. In a case where all of the chiral agent and the liquid crystal compound have a polymerizable group, the polymerization reaction of the polymerizable chiral agent and the polymerizable liquid crystal compound can give a polymer having a repeating unit derived from the polymerizable liquid crystal compound and a repeating unit derived from the chiral compound. In this embodiment, the polymerizable group of the polymerizable chiral compound is preferably the same as that of the polymerizable liquid crystal compound. Accordingly, the polymerizable group of the chiral agent is also preferably an unsaturated polymerizable group, an epoxy group, or an aziridinyl group, more preferably an unsaturated polymerizable group, and particularly preferably an ethylenic unsaturated polymerizable group.

The chiral agent may be a liquid crystal compound.

The content of the chiral agent in the liquid crystal composition is preferably 0.01 mol % to 200 mol %, and more preferably 1 mol % to 30 mol % of the amount of the polymerizable liquid crystal compound.

(Polymerization Initiator)

The liquid crystal composition preferably contains a polymerization initiator. In an embodiment in which a polymerization reaction is carried out by ultraviolet irradiation, a polymerization initiator to be used is preferably a photopolymerization initiator capable of initiating a polymerization reaction by ultraviolet irradiation. Examples of the photopolymerization initiator include α-carbonyl compounds (described in U.S. Pat. No. 2,367,661A and U.S. Pat. No. 2,367,670A), acyloin ethers (described in U.S. Pat. No. 2,448,828A), α-hydrocarbon-substituted aromatic acyloin compounds (described in U.S. Pat. No. 2,722,512A), polynuclear quinone compounds (described in U.S. Pat. No. 3,046,127A and U.S. Pat. No. 2,951,758A), combination of triarylimidazole dimer and p-aminophenylketone (described in U.S. Pat. No. 3,549,367A), acridine and phenazine compounds (described in JP1985-105667A (JP-S60-105667A) and U.S. Pat. No. 4,239,850A), and oxadiazole compounds (described in U.S. Pat. No. 4,212,970A).

The content of the photopolymerization initiator in the liquid crystal composition is preferably 0.1 to 20 mass %, and more preferably 0.5 mass % to 5 mass % with respect to the content of the polymerizable liquid crystal compound.

(Crosslinking Agent)

The liquid crystal composition may contain an arbitrary crosslinking agent in order to improve the film hardness after curing and durability. As the crosslinking agent, a material which is curable with ultraviolet rays, heat, moisture, or the like can be suitably used.

The crosslinking agent is not particularly limited, and can be appropriately selected in accordance with the purpose. Examples thereof include polyfunctional acrylate compounds such as trimethylolpropane tri(meth)acrylate and pentaerythritol tri(meth)acrylate; epoxy compounds such as glycidyl(meth)acrylate and ethylene glycol diglycidyl ether; aziridine compounds such as 2,2-bishydroxymethylbutanol-tris[3-(1-aziridinyl)propionate] and 4,4-bis(ethyleneiminocarbonylamino)diphenylmethane; isocyanate compounds such as hexamethylene diisocyanate and biuret-type isocyanate; polyoxazoline compounds having an oxazoline group in a side chain; and alkoxysilane compounds such as vinyltrimethoxysilane and N-(2-aminoethyl) 3-aminopropyltrimethoxysilane. A known catalyst can be used depending on the reactivity of the crosslinking agent in order to enhance productivity in addition to the enhancement of the film hardness and the durability. These may be used alone or in combination of two or more types thereof.

The content of the crosslinking agent is preferably 3 mass % to 20 mass %, and more preferably 5 mass % to 15 mass %. In a case where the content of the crosslinking agent is less than 3 mass %, the crosslinking density improving effect may not be obtained, and in a case where the content of the crosslinking agent is greater than 20 mass %, the stability of a layer to be formed may be reduced.

(Alignment Control Agent)

In the liquid crystal composition, an alignment control agent may be added to contribute to stable or rapid planar alignment. Examples of the alignment control agent include fluorine (meth)acrylate-based polymers described in paragraphs [0018] to [0043] in JP2007-272185A and compounds represented by Formulae (I) to (IV) described in paragraphs [0034] in JP2012-203237A.

The alignment control agents may be used alone or in combination of two or more types thereof.

The amount of the alignment control agent added in the liquid crystal composition is preferably 0.01 mass % to 10 mass %, more preferably 0.01 mass % to 5 mass %, and particularly preferably 0.02 mass % to 1 mass % with respect to the total mass of the polymerizable liquid crystal compound.

(Other Additives)

The liquid crystal composition may contain at least one selected from various additives such as a surfactant for uniformizing the film thickness by adjusting the surface tension of the coating film and a polymerizable monomer. Furthermore, if necessary, within a range that does not deteriorate the optical performance, a polymerization inhibitor, an antioxidant, an ultraviolet absorber, a light stabilizer, a coloring material, metal oxide particles, and the like can be added to the liquid crystal composition.

(Solvent)

The solvent used to prepare the liquid crystal composition is not particularly limited, and can be appropriately selected in accordance with the purpose. An organic solvent is preferably used.

The organic solvent is not particularly limited, and can be appropriately selected in accordance with the purpose. Examples thereof include ketones, alkyl halides, amides, sulfoxides, heterocyclic compounds, hydrocarbons, esters, and ethers. These may be used alone or in combination of two or more types thereof. Among these, ketones are particularly preferable in consideration of the load imposed on the environment.

(Coating, Alignment, Polymerization)

The method of coating a temporary support, an alignment film, a ¼ wavelength plate, a cholesteric liquid crystal layer serving as an underlayer, or the like with a liquid crystal composition is not particularly limited, and can be appropriately selected in accordance with the purpose. Examples thereof include a wire bar coating method, a curtain coating method, an extrusion coating method, a direct gravure coating method, a reverse gravure coating method, a die-coating method, a spin coating method, a dip coating method, a spray coating method, and a slide coating method. Furthermore, the coating can also be performed by transferring a liquid crystal composition, which has been separately applied onto a support. By heating the liquid crystal composition applied, the liquid crystal molecules are aligned. In the formation of a cholesteric liquid crystal layer, the liquid crystal molecules are preferably aligned in a cholesteric manner, and in the formation of the ¼ wavelength plate, the liquid crystal molecules are preferably aligned in a nematic manner. In the cholesteric alignment, the heating temperature is preferably equal to or lower than 200° C., and more preferably equal to or lower than 130° C. By this alignment, an optical thin film is obtained in which the polymerizable liquid crystal compound is aligned in a twisted manner to have a helical axis in a direction substantially perpendicular to the surface of the film.

In the nematic alignment, the heating temperature is preferably 50° C. to 120° C., and more preferably 60° C. to 100° C.

The aligned liquid crystal compound can be further subjected to polymerization so as to cure the liquid crystal composition. The polymerization may be any one of thermal polymerization and photopolymerization by light irradiation, but is preferably photopolymerization. Ultraviolet rays are preferably used for light irradiation. The irradiation energy is preferably 20 mJ/cm$^2$ to 50 J/cm$^2$, and more preferably 100 mJ/cm$^2$ to 1,500 mJ/cm$^2$. In order to accelerate the photopolymerization reaction, the light irradiation may be performed under heating conditions or in a nitrogen atmosphere. The wavelength of the ultraviolet rays for irradiation is preferably 350 nm to 430 nm. From the viewpoint of stability, the rate of the polymerization reaction is preferably high. The rate of the polymerization reaction is preferably equal to or higher than 70%, and more preferably equal to or higher than 80%. The rate of the polymerization reaction can be determined by measuring the consumption rate of polymerizable functional groups by using an infrared (IR) absorption spectrum.

The thickness of each cholesteric liquid crystal layer is not particularly limited as long as it is in such a range that the above-described characteristics are exhibited. The thickness is preferably in a range of 1.0 μm to 150 μm, and more preferably 4.0 μm to 100 μm.

The thickness of the ¼ wavelength plate formed from the liquid crystal composition is not particularly limited. The thickness is preferably 0.2 to 10 μm, and more preferably 0.5 to 2 μm.

(Temporary Support, Support, and Alignment Layer)

The liquid crystal composition may be coated on a surface of a temporary support or an alignment layer formed on the surface of the temporary support to form a layer. The temporary support, or the temporary support and the alignment layer may be peeled off after the formation of the layer. Particularly, when the ¼ wavelength plate is formed, a support may be used. The support may not be peeled off after the formation of the layer.

Examples of the temporary support and the support include polyester such as polyethylene terephthalate (PET), polycarbonate, an acrylic resin, an epoxy resin, polyurethane, polyamide, polyolefin, a cellulose derivative, silicone, and a glass plate.

The alignment layer can be provided by means of rubbing of an organic compound (resin such as polyimide, polyvinyl alcohol, polyester, polyarylate, polyamideimide, polyether imide, polyamide, and modified polyamide) such as a polymer, oblique vapor deposition of an inorganic compound, formation of a layer having microgrooves, or accumulation of an organic compound (for example, ω-tricosanoic acid, dioctadecylmethylammonium chloride, or methyl stearate) by a Langmuir-Blodgett method (LB film). Furthermore, an alignment layer may be used which obtains an alignment function by the application of an electric field or a magnetic field or by being irradiated with light.

Particularly, it is preferable that an alignment layer composed of a polymer is rubbed, and then the rubbed surface is coated with the liquid crystal composition. The rubbing can be performed by rubbing the surface of the polymer layer several times with paper or cloth in a certain direction.

The liquid crystal composition may be coated on a surface of a temporary support or a rubbed surface of a temporary support without providing the alignment layer.

The thickness of the alignment layer is preferably 0.01 to 5 μm, and more preferably 0.05 to 2 μm.

(Lamination Film of ¼ Wavelength Plate and Cholesteric Liquid Crystal Layer)

As described above, the ¼ wavelength plate and the cholesteric liquid crystal layer can be formed in such a manner that a liquid crystal composition obtained by dissolving, in a solvent, a polymerizable liquid crystal compound, a polymerization initiator, and optional additives such as a chiral agent and a surfactant is coated and dried on a temporary support, an alignment layer, a ¼ wavelength plate, or a cholesteric liquid crystal layer produced previously to obtain a coating film, and the polymerizable liquid crystal compound is aligned in a desired form in the coating film, and then polymerized to fix the alignment. A laminate of the layers formed from the polymerizable liquid crystal compound can be formed by repeating the above-described processes. Some layers or a part of a lamination film may be separately produced and bonded using an adhesive layer.

In the formation of a lamination film of a ¼ wavelength plate and a cholesteric liquid crystal layer, a lamination film consisting of a plurality of cholesteric liquid crystal layers, or a lamination film consisting of a ¼ wavelength plate and a plurality of cholesteric liquid crystal layers, a process including: directly coating a surface of a ¼ wavelength plate or a previous cholesteric liquid crystal layer with a liquid crystal composition containing a polymerizable liquid crystal compound and the like; alignment; and fixing may be repeated. Otherwise, a ¼ wavelength plate, a cholesteric liquid crystal layer, or a laminate thereof prepared separately may be laminated using an adhesive or the like. However, the former is preferable. The reason for this is that, in general, in a case where an adhesive layer provided to have a film thickness of 0.5 to 10 μm is used, interference unevenness resulting from thickness unevenness of the adhesive layer may be observed, and thus it is preferable that the lamination is performed without using the adhesive layer. In addition, the reason for this is that in a lamination film of cholesteric liquid crystal layers, in a case where a cholesteric liquid crystal layer is formed so as to be in direct contact with a surface of a cholesteric liquid crystal layer formed previously, an alignment direction of liquid crystal molecules on the air interface side of the cholesteric liquid crystal layer formed previously is identical to an alignment direction of liquid crystal molecules on the lower side of the cholesteric liquid crystal layer formed thereon, and the polarization characteristics of the laminate of the cholesteric liquid crystal layers are enhanced.

[Front Surface Plate]

The mirror with an image display function of the invention has a front surface plate.

The front surface plate is not particularly limited. A glass plate or a plastic plate used to produce a usual mirror can be used as the front surface plate. The front surface plate is preferably transparent in a visible light region and preferably has low birefringence. Here, transparent in a visible light region means that the light transmittance in the visible light region is 80% or greater, and preferably 85% or greater. The light transmittance which is used as a measure of transparency is obtained using the method described in JIS A5759. That is, the transmittance is measured at wavelengths of 380 nm to 780 nm using a spectrophotometer, and multiplied by a weight value coefficient obtained from a spectral distribution of the International Commission on Illumination (CIE) daylight D65 and a wavelength distribution and a wavelength interval of CIE spectral luminous efficiency for photopic vision to calculate a weighted average, and thus the visible light transmittance is obtained. Examples of the plastic film include polycarbonate, an acrylic resin, an epoxy resin, polyurethane, polyamide, polyolefin, a cellulose derivative, and silicone.

The film thickness of the front surface plate may be approximately 100 μm to 10 mm, preferably 200 μm to 5 mm, and more preferably 500 μm to 1000 μm.

[Adhesive Layer]

The mirror with an image display function of the invention may include an adhesive layer for adhesion between the image display device and the circular polarization reflection layer, between the circular polarization reflection layer and the front surface plate, and between other respective layers. The adhesive layer may be formed from an adhesive.

Adhesives are classified into hot-melt types, thermosetting types, photocurable types, reaction-curable types, and pressure-sensitive types which do not require curing. As the materials of these adhesives, it is possible to use compounds based on acrylate, urethane, urethane acrylate, epoxy, epoxy acrylate, polyolefin, modified olefin, polypropylene, ethylene vinyl alcohol, vinyl chloride, chloroprene rubber, cyanoacrylate, polyamide, polyimide, polystyrene, polyvinyl butyral, or the like. From the viewpoint of workability and productivity, photocuring is preferable as the curing method. From the viewpoint of optical transparency and heat resistance, materials based on acrylate, urethane acrylate, epoxy acrylate, or the like are preferably used.

<Half Mirror>

A half mirror can be formed using a circular polarization reflection layer, a ¼ wavelength plate, and a front surface plate. A half mirror may be produced by forming, on a front surface plate, a circular polarization reflection layer and a ¼ wavelength plate in this order from the front surface plate, or by transferring a ¼ wavelength plate and a circular polarization reflection layer formed on a temporary support onto a front surface plate. For example, a half mirror can be obtained in such a manner that on a temporary support, a ¼ wavelength plate and a cholesteric liquid crystal layer are sequentially formed to form a laminate of the ¼ wavelength plate and the circular polarization reflection layer, the laminate is adhered to a front surface plate on a surface of the circular polarization reflection layer, and then the temporary support is peeled off if necessary. The temporary support may function as a protective film until the ¼ wavelength plate and the circular polarization reflection layer are adhered to the image display device.

<Method of Producing Mirror with Image Display Function>

The mirror with an image display function of the invention can be produced by, for example, positioning the ¼ wavelength plate side of a half mirror including a circular polarization reflection layer, a ¼ wavelength plate, and a front surface plate on an image display surface of an image display device. Then, if necessary, the image display device and the half mirror may be formed integrally with each other. The image display device and the half mirror may be formed integrally with each other through connection or adhesion at an outer frame or a hinge.

<Use of Mirror with Image Display Function>

The use of the mirror with an image display function of the invention is not particularly limited. For example, it can be used as a security mirror, a mirror of a hair salon or a barbershop, or the like, and can display an image such as texture information, a still image, or a motion picture. In addition, the mirror with an image display function may be a vehicle rearview mirror, or may be used for a television, a personal computer, a smartphone, a cell phone, or the like.

EXAMPLES

Hereinafter, the invention will be described in more detail with reference to examples. The materials, the reagents, the amounts of materials, the proportions thereof, the operations, and the like which will be shown in the following examples can be appropriately modified within a range not departing from the gist of the invention. Accordingly, the scope of the invention is not limited to the following examples.

<Preparation of Liquid Crystalline Mixture (X)>

The following Compound 1, Compound 2, Fluorine-based Horizontal Alignment Agent 1, Fluorine-based Horizontal Alignment Agent 2, polymerization initiator, and solvent (methyl ethyl ketone) were mixed to prepare a coating liquid having the following composition.

| | |
|---|---|
| Compound 1 | 80 parts by mass |
| Compound 2 | 20 parts by mass |
| Fluorine-based Horizontal Alignment Agent 1 | 0.1 parts by mass |
| Fluorine-based Horizontal Alignment Agent 2 | 0.007 parts by mass |
| Polymerization Initiator IRGACURE 819 (manufactured by BASF) | 3 parts by mass |
| Solvent (methyl ethyl ketone) | The amount thereof was set such that the concentration of the solute was 30 mass %. |

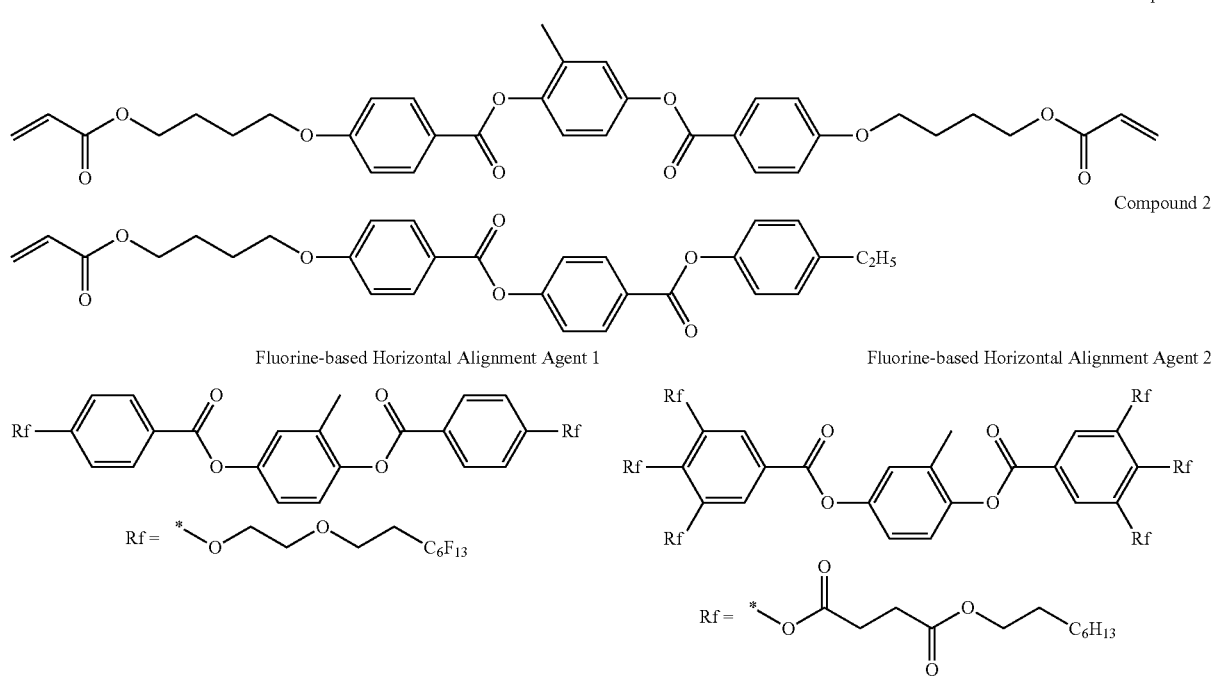

<Preparation of Cholesteric Liquid Crystalline Mixture (R)>

The following Compound 1, Compound 2, Fluorine-based Horizontal Alignment Agent 1, Fluorine-based Horizontal Alignment Agent 2, chiral agent, polymerization initiator, and solvent (methyl ethyl ketone) were mixed to prepare a coating liquid having the following composition.

| | |
|---|---|
| Compound 1 | 80 parts by mass |
| Compound 2 | 20 parts by mass |
| Fluorine-based Horizontal Alignment Agent 1 | 0.1 parts by mass |
| Fluorine-based Horizontal Alignment Agent 2 | 0.007 parts by mass |
| Right-Turning Chiral Agent LC756 (manufactured by BASF) | The amount thereof was adjusted in accordance with a target reflection wavelength. |
| Polymerization Initiator IRGACURE 819 (manufactured by BASF) | 3 parts by mass |
| Solvent (methyl ethyl ketone) | The amount thereof was set such that the concentration of the solute was 30 mass %. |

Coating liquids (R1) to (R4) were prepared by adjusting the prescribed amount of the chiral agent LC-756 of the mixture (R). Using each coating liquid, a single cholesteric liquid crystal layer was produced on a temporary support in the same manner as in the following production of a circular polarization reflection layer, and reflection characteristics were confirmed. All of the produced cholesteric liquid crystal layers were right-circular polarization reflection layers, and the central reflection wavelengths were as in the following Table 1.

TABLE 1

| Coating Liquid | Central Reflection Wavelength |
|---|---|
| Coating Liquid (R1) | 450 nm |
| Coating Liquid (R2) | 540 nm |
| Coating Liquid (R3) | 630 nm |
| Coating Liquid (R4) | 720 nm |

Example 1

<Formation of Circular Polarization Reflection Layer>

Using the prepared coating liquid, a circular polarization reflection layer was produced in accordance with the following procedures. A PET film (no undercoat layer, thickness: 75 μm) manufactured by Fujifilm Corporation was rubbed and used as a temporary support.

(1) The liquid crystalline mixture (X) was coated on a surface of a rubbed surface of a temporary support at room temperature using a wire bar such that the thickness of the film after drying was 0.7 After the solvent was removed by drying for 30 seconds at room temperature, the film was heated for 2 minutes in an atmosphere at 125° C., and then a nematic liquid crystal phase was obtained at 85° C. Next, UV irradiation was performed for 6 to 12 seconds with an output of 60% using an electrodeless lamp "D-BULB" (90 W/cm) manufactured by Fusion UV Systems to fix the nematic liquid crystal phase, and thus a ¼ wavelength plate was obtained.

(2) The coating liquid (R1) shown in Table 1 was coated at room temperature on a surface of the ¼ wavelength plate using a wire bar such that the thickness of the film after drying was 3.0 μm.

(3) After the solvent was removed by drying for 30 seconds at room temperature, the film was heated for 2 minutes in an atmosphere at 125° C., and then a cholesteric liquid crystalline phase was obtained at 95° C. Next, UV irradiation was performed for 6 to 12 seconds with an output of 60% using an electrodeless lamp "D-BULB" (90 W/cm) manufactured by Fusion UV Systems to fix the cholesteric liquid crystalline phase, and thus a cholesteric liquid crystal layer was produced. The cholesteric liquid crystal layer was cooled to the room temperature.

(4) The coating liquid (R2) shown in Table 1 was coated on a surface of the obtained cholesteric liquid crystal layer, and the above-described processes (2) and (3) were repeated. The coating liquid (R3) shown in Table 1 was coated on a surface of the obtained second cholesteric liquid crystal layer, and the above-described processes (2) and (3) were repeated to form a circular polarization reflection layer consisting of three cholesteric liquid crystal layers on the ¼ wavelength plate.

<Bonding of Circular Polarization Reflection Layer and Front Surface Plate>

A UV-curable adhesive Exp. U12034-6 manufactured by DIC CORPORATION was coated on a surface of the cholesteric liquid crystal layer of the laminate produced in the above description using a wire bar at room temperature such that the thickness of the dried film after drying was 5 μm.

This coated surface and a front surface plate (FRONT GLASS FL2 manufactured by Central Glass Co., Ltd., thickness: 2 mm) were bonded such that air bubbles were prevented from entering therebetween. Then, UV irradiation was performed for 6 to 12 seconds with an output of 60% using a D-BULB (lamp, 90 W/cm) manufactured by Fusion UV Systems at 50° C. Then, the temporary support was peeled off, and thus a half mirror A was produced.

Example 2

A half mirror B was produced in the same manner as in Example 1, except that the order of the coating lamination on the surface of the ¼ wavelength plate was changed to an order of the coating liquid (R3), the coating liquid (R2), and the coating liquid (R1).

Example 3

A half mirror C was produced in the same manner as in Example 1, except that the order of the coating lamination on the surface of the ¼ wavelength plate was changed to an order of the coating liquid (R4), the coating liquid (R3), the coating liquid (R2), and the coating liquid (R1).

Comparative Example 1

A half mirror D was produced in the same manner as in Example 1, except that the ¼ wavelength plate was not provided.

Comparative Examples 2 and 3

<Bonding of Commercially Available Reflection-Type Mirror Film and Front Surface Plate>

An APF sold by 3M United States or a commercially available metal-deposited mirror was used and bonded to a front surface plate (FRONT GLASS FL2 manufactured by Central Glass Co., Ltd., thickness: 2 mm) through a method using the same UV-curable adhesive as above, and thus half mirrors E and F were produced.

<Evaluation of Mirror with Image Display Function>

Each produced half mirror was disposed such that the circular polarization reflection plate was superposed on an image display surface of a liquid crystal display device (LCD) (manufactured by Apple Inc., iPad Air) (emission peak wavelength, 450 nm (B), 540 nm (G), 630 nm (R)) and the front surface plate was on the opposite side (nearest to an observer). At this time, the slow axis of the ¼ wavelength plate (one piece type) was inclined by 45 degrees with respect to the transmission axis of the LCD (polarization direction of light emission of the LCD). In addition, a half mirror using an APF was disposed such that the transmission axis of a LCD and the transmission axis of the APF were identical to each other. The obtained configurations were evaluated as follows as Example 1 and Comparative Examples 1 to 3. The results are shown in Table 2.

<Evaluation>

(Brightness)

The front luminance during white display of the liquid crystal display device was measured using a measuring machine (EZ-Contrast 160D manufactured by ELDIM) as in the description in a paragraph [0180] in JP2009-93166A. "(The front luminance after the installation of the half mirror/the front luminance before the installation of the half mirror)×100%" was obtained for evaluation based on the following standards.

A: 100% or less and greater than 50%
B: 50% or less and greater than 40%
C: 40% or less (Front Tint of Image, Possibility of Visual Recognition of Mirror-Reflected Image)

The visual evaluation was performed through polarized sunglasses.

Regarding the evaluation of the front tint of an image, an example in which color balance and the like did not considerably change in comparison with an image when viewed without the polarized sunglasses was evaluated to be "good", and a case where color balance and the like changed was evaluated to be "bad".

Regarding the possibility of the visual recognition of a mirror-reflected image, an example in which even in a case where the image display surface of the mirror with an image display function was rotated about a normal line thereof with respect to the polarized sunglasses, a mirror-reflected image could be always visually recognized was evaluated to be "possible", and an example in which there was a direction in which the mirror-reflected image could not be visually recognized was evaluated to be "not possible".

What is claimed is:

1. A mirror with an image display function comprising, in this order:
    an image display device;
    a ¼ wavelength plate;
    a circular polarization reflection layer; and
    a front surface plate made of glass or plastic,
    wherein the circular polarization reflection layer includes four or more cholesteric liquid crystal layers, and the four or more cholesteric liquid crystal layers have different central wavelengths of selective reflection,
    wherein the circular polarization reflection layer includes a cholesteric liquid crystal layer having a central wavelength of selective reflection in a red light wavelength region, a cholesteric liquid crystal layer having a central wavelength of selective reflection in a green light wavelength region, a cholesteric liquid crystal layer having a central wavelength of selective reflection in a blue light wavelength region, and a cholesteric liquid crystal layer having a central wavelength of selective reflection in an infrared light region.

2. The mirror with an image display function according to claim 1,
    wherein two or more cholesteric liquid crystal layers of the four or more cholesteric liquid crystal layers are in direct contact with each other.

3. The mirror with an image display function according to claim 1,
    wherein in the circular polarization reflection layer, a cholesteric liquid crystal layer having a longer central wavelength of selective reflection is disposed closer to the image display device.

4. The mirror with an image display function according to claim 1,
    wherein the ¼ wavelength plate is a layer formed by curing a composition containing a polymerizable liquid crystal compound.

5. The mirror with an image display function according to claim 1,
    wherein the circular polarization reflection layer and the ¼ wavelength plate are in direct contact with each other.

6. The mirror with an image display function according to claim 1,
    wherein the image display device and the ¼ wavelength plate are directly adhered to each other through an adhesive layer.

TABLE 2

|  | ¼ Wavelength Plate | First Layer | Second Layer | Third Layer | Fourth Layer | Brightness | Sunglasses Evaluation Front Tint of Image | Sunglasses Evaluation Possibility of Visual Recognition of Mirror-Reflected Image |
|---|---|---|---|---|---|---|---|---|
| Comparative Example 1 | None | R1 | R2 | R3 | — | C (40%) | Good | Possible |
| Example 1 | Used | R1 | R2 | R3 | — | A (90%) | Good | Possible |
| Example 2 | Used | R3 | R2 | R1 | — | A (90%) | Good | Possible |
| Example 3 | Used | R4 | R3 | R2 | R1 | A (87%) | Good | Possible |
| Comparative Example 2 |  | APF |  |  |  | A (85%) | Good | Not Possible |
| Comparative Example 3 |  | Metal-Deposited Mirror |  |  |  | C (38%) | Good | Possible |

7. The mirror with an image display function according to claim 1,
   which has an outer frame.

\* \* \* \* \*